United States Patent
Yeon et al.

(10) Patent No.: US 7,720,175 B2
(45) Date of Patent: May 18, 2010

(54) APPARATUS AND METHOD FOR REDUCING PEAK-TO-AVERAGE POWER RATIO IN AN OFDM COMMUNICATION SYSTEM

(75) Inventors: Hae-Dong Yeon, Bucheon-si (KR);
Jae-Yong Lee, Yongin-si (KR);
Yun-Sang Park, Suwon-si (KR);
Bong-Gee Song, Seongnam-si (KR);
Dong-Kyu Kim, Seoul (KR);
Dong-Joon Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 951 days.

(21) Appl. No.: 11/501,964

(22) Filed: Aug. 10, 2006

(65) Prior Publication Data

US 2007/0041459 A1    Feb. 22, 2007

(30) Foreign Application Priority Data

Aug. 10, 2005    (KR) .................... 10-2005-0073263

(51) Int. Cl.
*H04K 1/02*    (2006.01)
*H04L 25/03*    (2006.01)
*H04L 25/49*    (2006.01)

(52) U.S. Cl. .................... 375/297; 375/296; 455/114.3; 398/193; 398/194

(58) Field of Classification Search ......... 375/295–297; 455/91, 114.2, 114.3; 398/182, 192–194
See application file for complete search history.

(56) References Cited

U.S. PATENT DOCUMENTS

2002/0176480 A1* 11/2002 Wheatley et al. ............ 375/130
2002/0197970 A1* 12/2002 Jian et al. ................ 455/245.2
2007/0153673 A1*  7/2007 Tomisato et al. ............ 370/208

FOREIGN PATENT DOCUMENTS

WO    WO 2004/051900    *  6/2004

* cited by examiner

*Primary Examiner*—Shuwang Liu
*Assistant Examiner*—James M Perez
(74) *Attorney, Agent, or Firm*—The Farrell Law Firm, LLP

(57) ABSTRACT

A Peak-to-Average Power Ratio (PAPR) reduction apparatus and method in an OFDM communication system are provided. In the PAPR reduction method, magnitude and phase components are extracted from transmission sample data. Peaks having magnitude components exceeding a threshold are detected by comparing the extracted magnitude components with the threshold. The highest of the peaks is detected and compared with the threshold. If the highest peak is greater than the threshold, the highest peak is updated.

12 Claims, 4 Drawing Sheets

APPARATUS AND METHOD FOR REDUCING PEAK-TO-AVERAGE POWER RATIO IN AN OFDM COMMUNICATION SYSTEM

This application claims priority under 35 U.S.C. §119 to an application entitled "Apparatus and Method for Reducing Peak-to-Average Power Ratio in an OFDM Communication System" filed in the Korean Intellectual Property Office on Aug. 10, 2005 and assigned Serial No. 2005-73263, the contents of which are incorporated herein by reference.

BACKGROUND OF THE INVENTION

1. Field of the Invention

The present invention relates generally to a Multi-Carrier Modulation (MCM) communication system, and in particular, to an apparatus and method for reducing Peak-to-Average Power Ratio (PAPR) in an Orthogonal Frequency Division Multiplexing (OFDM) communication system.

2. Description of the Related Art

OFDM is a type of MCM in which a serial symbol sequence is parallelized and modulated to a plurality of mutually orthogonal subcarriers or subchannels.

In OFDM, since data is sent on multiple subcarriers, the amplitude of a final OFDM signal equals the sum of the amplitudes of the individual subcarriers and thus varies significantly. If the subcarriers are in phase, the amplitude of the OFDM signal is very high. The resulting MCM-incurred high PAPR leads a High Power Amplifier (HPA) out of a linear operation range and a signal passing through the HPA is distorted. While the HPA is to be operated in a non-linear area in order to achieve maximum output, it actually operates in a linear area by dropping an input power level in a back-off scheme due to the distortion.

The back-off scheme drops the operation point of the HPA to reduce signal distortion. Since power consumption increases with a higher back-off value, amplifier efficiency is degraded considerably. Therefore, a high-PAPR signal degrades the efficiency of a linear amplifier and places the operation point of a non-linear amplifier in a non-linear area, causing non-linear distortion, inter-modulation between carriers and spectrum radiation.

In general, the OFDM communication system reduces PAPR by clipping, block coding, phase adjustment, Tone Reservation (TR) or peak windowing.

In peak windowing, a threshold depends on how much the PAPR is to be reduced, and a weight function is achieved using the original signal and the threshold. A band-limited weight function acquired using a convolution of the weight function and a window function is multiplied by the original signal in the time domain, thereby reducing the signal magnitude at or below the threshold and thus reducing the PAPR. The band-limited weight function significantly distorts the time-domain original signal. The signal distortion and spectral properties are in a trade-off relationship and adjusted appropriately according to the type and size of the window. It is critical to choose an appropriate threshold, window type and window size such that the PAPR is reduced to a desired level, while Bit Error Rate (BER) performance and the spectral properties are maintained. The peak windowing scheme does not require side information at a receiver, enables signal recovery without any additional device, and offers excellent spectral properties, obviating the need for filtering.

FIG. 1 is a flowchart illustrating a conventional peak windowing method in a peak windower.

Referring to FIG. 1, the peak windower is in an idle state 102 and monitors reception of transmission sample data in step 100. If no signals are received, the peak windower is kept in the idle state in step 102. Upon receipt of transmission sample data, the peak windower extracts magnitude and phase components from the input signal in step 104. In step 106, the peak windower detects the peaks of the input signal exceeding a threshold by comparing the magnitude components with the threshold. The peak windower performs peak windowing on the peaks in step 108 and outputs the peak-windowed signal in step 110.

Peak windowing is a technique of improving the spectrum performance of a signal using clipping and windowing in combination, expressed in Equation (1) as $$y(n) = b(n)x(n) \tag{1}$$

where y(n) represents the peak-windowed signal, x(n) represents the input signal, and b(n) represents a value calculated by Equation (3) using a dipping coefficient and a windowing coefficient.

$$x(n) = |x(n)| \exp(j\varphi(n)) \tag{2}$$

$$b(n) = 1 - \sum_{k=-\infty}^{\infty} [1 - c(k)] w(n-k) \tag{3}$$

where w(n) is the windowing coefficient and c(n) is the clipping coefficient given as Equation (4):

$$c(n) = \begin{cases} 1, & |x(n)| \le A \\ \dfrac{A}{|x(n)|}, & |x(n)| > A \end{cases} \tag{4}$$

where x(n) is the input signal and A is the threshold by which to detect the peaks.

Given a Fast Fourier Transform (FFT) size of N and a window function length of W, 3W operations are required for each sample according to Equation (3). Thus, 3WN computations are carried out for N samples. Furthermore, an additional N multiplications are performed according to Equation (1). As a consequence, the conventional peak windowing requires (3W+1)N computations.

For details of the peak windowing technique, see O. Vaananen, J. Vankka, and K. Halonen, "Simple algorithm for peak windowing and its application in GSM, EDGE and WCDMA systems, Communications, IEEE Proceedings-Volume 152, Issue 3, 3 Jun. 2005, pp. 357-362.

Since the convolution of the peak windowing technique requires a large volume of computation, there exists a need for reducing the computation complexity.

SUMMARY OF THE INVENTION

An object of the present invention is to substantially solve at least the above problems and/or disadvantages and to provide at least the advantages below. Accordingly, an object of the present invention is to provide an apparatus and method for reducing PAPR using an iterative peak windowing technique in an OFDM communication system.

Another object of the present invention is to provide an apparatus and method for reducing PAPR with a small volume of computation in an OFDM communication system.

A further object of the present invention is to provide an apparatus and method for reducing PAPR by repeating the process of detecting a maximum peak and multiplying the maximum peak by a window value in an OFDM communication system.

According to the present invention, in a PAPR reduction apparatus for an OFDM communication system, a magnitude/phase extractor extracts magnitude components and phase components from transmission sample data. A maximum peak detector detects the highest peak by determining the magnitude component of each sample received from the magnitude/phase extractor. A peak windower updates the highest peak, if the highest peak is greater than a threshold, and feeds back the updated highest peak to the maximum peak detector.

According to the present invention, in a PAPR reduction method for an OFDM communication system, magnitude components and phase components are extracted from transmission sample data. Peaks having magnitude components exceeding a threshold are detected by comparing the extracted magnitude components with the threshold. The highest of the peaks is detected and compared with the threshold. If the highest peak is greater than the threshold, the highest peak is updated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides an apparatus and method for PAPR reduction in an OFDM communication system. Iterative peak windowing according to the present invention is defined as a technique for repeating the process of detecting the highest of peaks exceeding a threshold and peak-windowing the maximum peak until there are no peaks exceeding the threshold.

Figure 1:
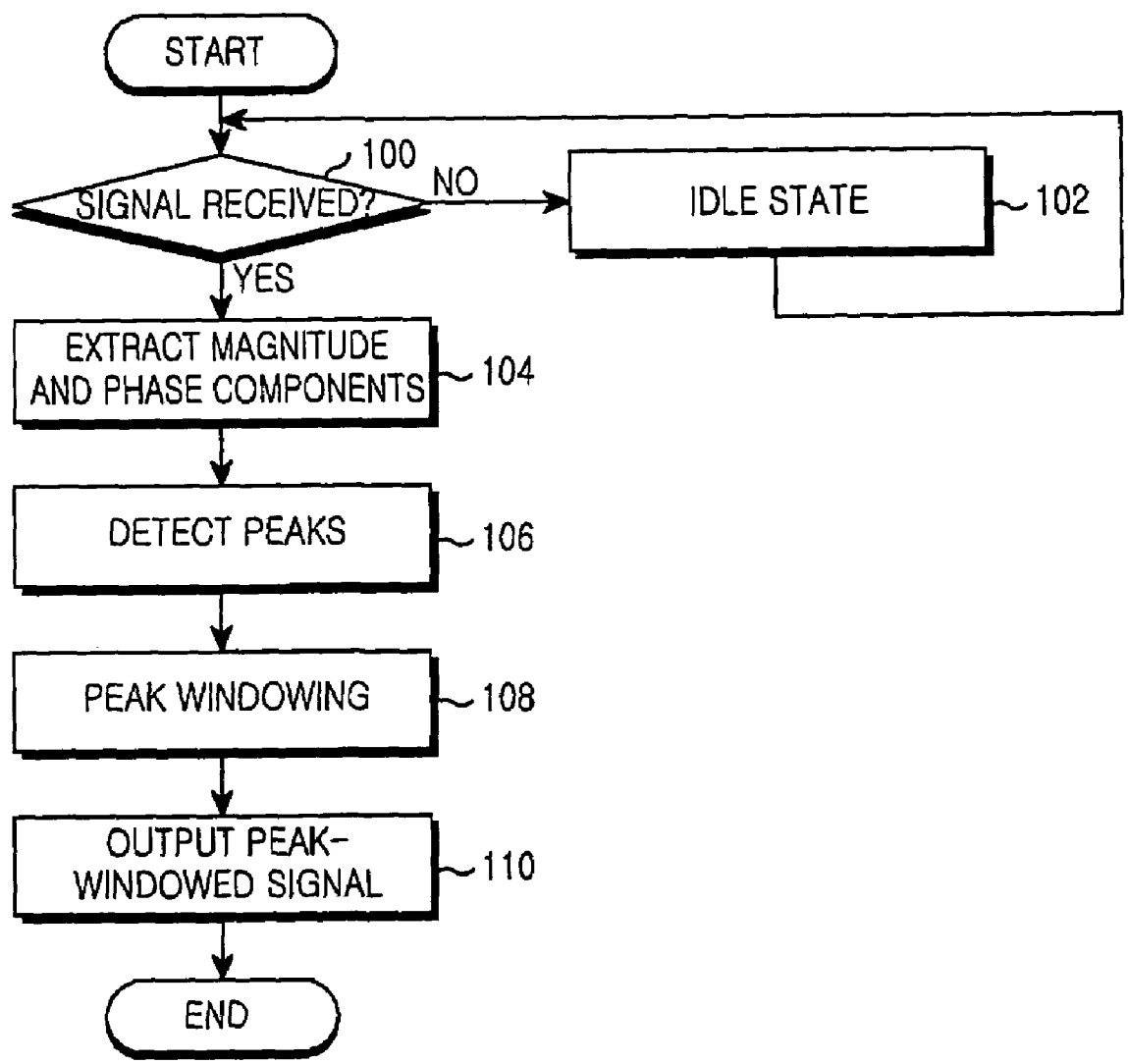
FIG. 1 is a flowchart illustrating a conventional peak windowing operation in a peak windower.
Figure 2:
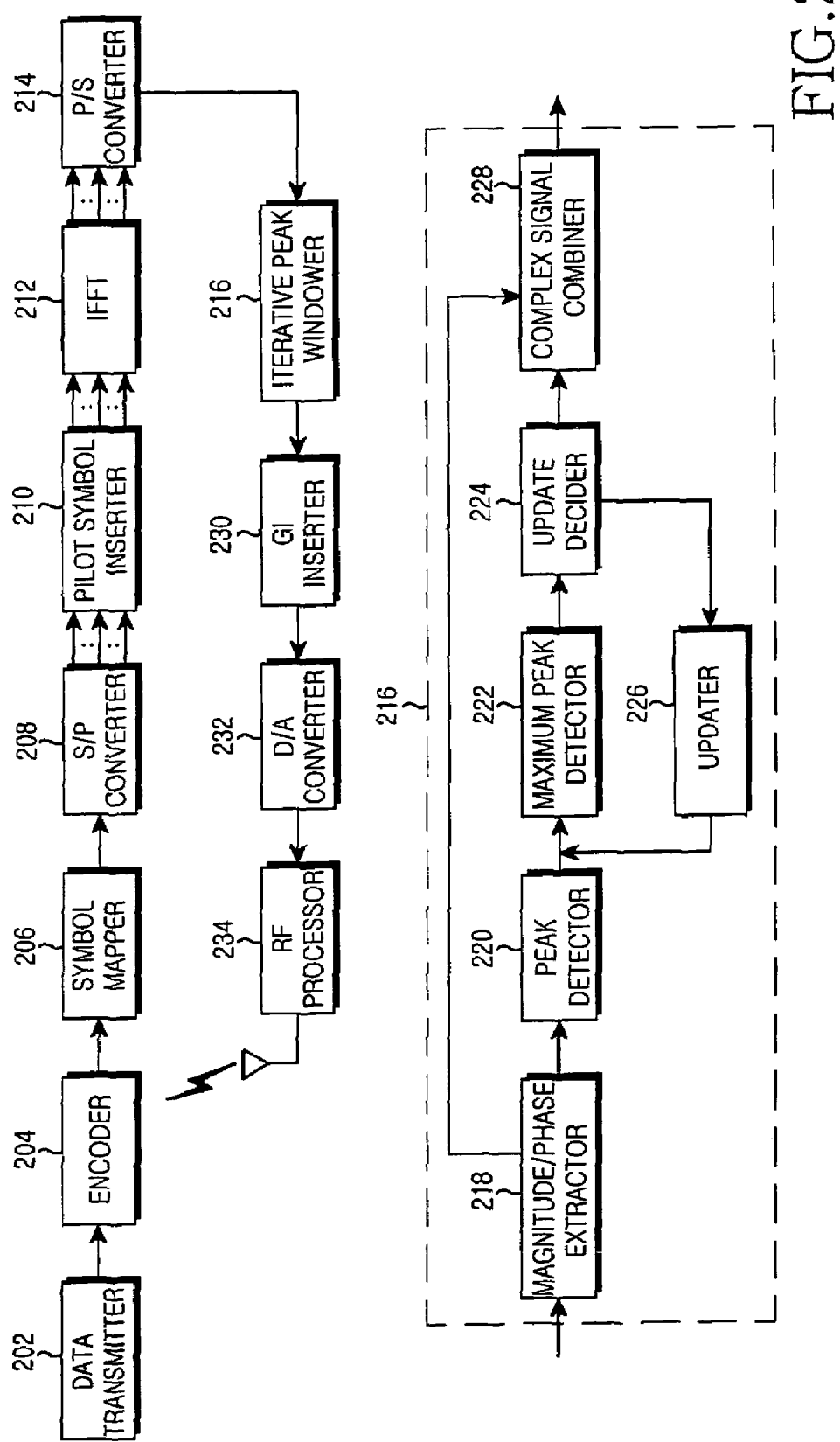
FIG. 2 is a block diagram of a PAPR reduction apparatus in an OFDM communication system according to the present invention.

FIG. 2 is a block diagram of a PAPR reduction apparatus in an OFDM communication system according to the present invention.

Referring to FIG. 2, the PAPR reduction apparatus includes a data transmitter 202, an encoder 204, a symbol mapper 206, a Serial-to-Parallel (S/P) converter 208, a pilot symbol inserter 210, an Inverse Fast Fourier Transform (IFFT) processor 212, a Parallel-to-Serial (P/S) converter 214, an iterative peak windower 216, a Guard Interval (GI) inserter 230, a Digital-to-Analog (D/A) converter 232 and a Radio Frequency (RF) processor 234.

In operation, the data transmitter 202 generates user and control data bits. The encoder 204 encodes the user and the control data bits in a coding method such as turbo coding or convolutional coding with a selected coding rate. The symbol mapper 206 modulates the coded bits in a modulation scheme such as Binary Phase Shift Keying (BPSK), Quadrature Phase Shift Keying (QPSK), 16-ary Quadrature Amplitude Modulation (16QAM) or 64QAM.

The S/P converter 208 parallelizes the modulation symbols received from the symbol mapper 206 and the pilot symbol inserter 210 inserts pilot symbols into the parallel modulation symbols.

The IFFT processor 212 performs N-point IFFT on the parallel signals received from the pilot symbol inserter 210. The P/S converter 214 serializes the IFFT signals and the iterative peak windower 216 reduces the PAPR of the serial signal, which will be described later in more detail. The GI inserter 230 inserts a GI into the PAPR-reduced signal.

The GI is inserted to cancel interference between the previous OFDM symbol and the current OFDM symbol. Although it was initially proposed that null data is inserted as a GI, interference may be caused between subcarriers, thus increasing the probability of an incorrect decision of a received OFDM symbol when a receiver incorrectly estimates the start of the OFDM symbol. Hence, the GI is taken in the form of a cyclic prefix or suffix. The cyclic prefix is to insert a copy of a number of last bits of a time-domain OFDM symbol into an effective OFDM symbol, while the cyclic suffix is to insert a copy of a number of first bits of a time-domain OFDM symbol into an effective OFDM symbol.

The D/A converter 232 converts the GI-including signal to an analog signal. The RF processor 234, including a filter and a front-end unit, processes the analog signal to an RF signal suitable for transmission and sends the RF signal through a transmit antenna.

To reduce the PAPR of the serial signal received from the P/S converter 214, the iterative peak windower 216 includes a magnitude/phase extractor 218, a peak detector 220, a maximum peak detector 222, an update decider 224, an updater 226 and a complex signal combiner 228.

In the iterative peak windower 216, the magnitude/phase extractor 218 extracts magnitude components absx(n) and phase components angx(n) separately from transmission sample data received from the P/S converter 214 and provides the magnitude components absx(n) to the peak detector 220 and the phase components angx(n) to the complex signal combiner 228. The magnitude components absx(n) are determined in Equation (5) by $$absx(n) = \begin{cases} |x(n - (w\_len - 1)/2)|, & (w\_len - 1)/2 \le n < len + (w\_len - 1)/2 \\ 0, & \text{otherwise} \end{cases} \quad (5)$$

where absx(n) represents the magnitude components of the input signal, x(n) represents the input signal, w_len represents a window size and len represents an IFFT size.

The peak detector 220 detects peaks p(k) higher than a threshold A by comparing the magnitude components absx(n) with the threshold A.

The maximum peak detector 222 detects the highest peak $x_{r,max}$ among the peaks p(k) by Equation (6), in which $$x_{r,max} = \max_{1 \le k < K} absx(p(k)) = absx(n_{r,max}) \quad (6)$$

where $x_{r,max}$ represents the highest peak, K represents the total number of peaks and $n_{r,max}$ represents the index of the highest peak.

The update decider 224 compares the highest peak $x_{r,max}$ with the threshold A. If the highest peak $x_{r,max}$ is greater than the threshold A, the update decider 224 provides the highest peak $x_{r,max}$ to the updater 226. Otherwise, it provides the highest peak $x_{r,max}$ to the complex signal combiner 228.

The updater 226 updates the highest peak $x_{r,max}$ by multiplying the highest peak $x_{r,max}$ by a window value, and feeds back the updated highest peak to the maximum peak detector 222. In Equation (7), $$absx_{r+1}(n) = \begin{cases} absx_r(n)d_r(n-m_1), & m_1 \le n < m_2 \\ absx_r(n), & \text{otherwise} \end{cases} \quad (7)$$

$$d_r(i) = 1 - (i)(1 - A/x_{r,max})$$

$$m_1 = n_{r,max} - \frac{W-1}{2},$$

$$m_2 = n_{r,max} + \frac{W-1}{2}$$

where r represents the number of iterations of peak windowing, $absx_r(n)$ represents the magnitude component of an $n^{th}$ sample in an $r^{th}$ peak windowing, $d_r(i)$ represents a window value for the $r^{th}$ peak windowing, w(i) represents a weight value, A represents the threshold, $x_{r,max}$ represents the highest peak, $n_{r,max}$ represents the index of the highest peak and W represents the window size.

The complex signal combiner 228 generates a complex signal by combining the magnitude components received from the update decider 224 with the phase components received from the magnitude/phase extractor 218, if there is no signal having a magnitude component exceeding the threshold A. The complex signal is generated in Equation (8) by $$y(l) = absx_r(l + (w_{13}len - 1)/2) \exp(j \cdot angx(l)), l = 0, 1, len-1 \quad (8)$$

where y(l) represents the complex signal value, $absx_r(l)$ represents the magnitude component of an $l^{th}$ sample in the $r^{th}$ peak windowing, w_len represents the window size, angx(l) represents the phase component of the $l^{th}$ sample, and len represents the IFFT size.

Figure 3:
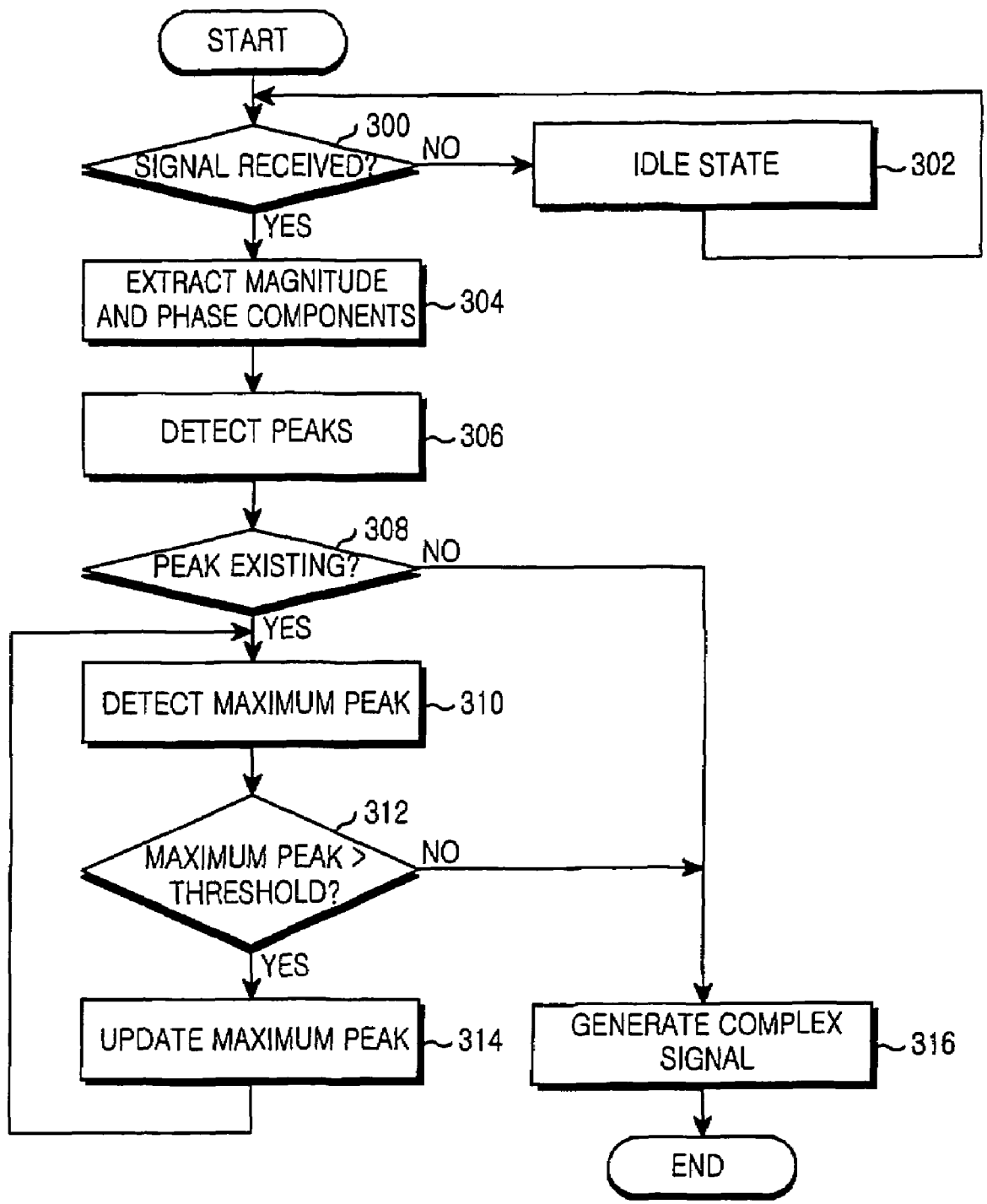
FIG. 3 is a flowchart illustrating a PAPR reduction operation in an iterative peak windower in the OFDM communication system according to the present invention.

FIG. 3 is a flowchart illustrating the PAPR reduction operation of the iterative peak windower in the OFDM communication system according to the present invention.

Referring to FIG. 3, the iterative peak windower remains in an idle state in step 302 and monitors reception of transmission sample data in step 300. If no signals are received, the iterative peak windower is kept in the idle state in step 302. Upon receipt of the transmission sample data, the iterative peak windower extracts magnitude and phase components from the input signal in step 304 and detects peaks with magnitudes exceeding the threshold by comparing the magnitude components with the threshold in step 306. In step 308, the iterative peak windower determines the presence or absence of any peak. In the absence of any peak, the iterative peak windower goes to step 316 and in the presence of any peak, the iterative peak windower proceeds to step 310.

The iterative peak windower detects the highest of the detected peaks in step 310 and compares the highest peak with the threshold in step 312. If the highest peak is less than or equal to the threshold, the iterative peak windower goes to step 316.

If the highest peak is greater than the threshold, the iterative peak windower updates the highest peak by Equation (7) in step 314 and returns to step 310.

In the absence of any peak in step 308 or if there is no peak exceeding the threshold in step 312, the iterative peak windower generates a complex signal by combining the magnitude components with the phase components according to Equation (8) in step 316.

Figure 4:
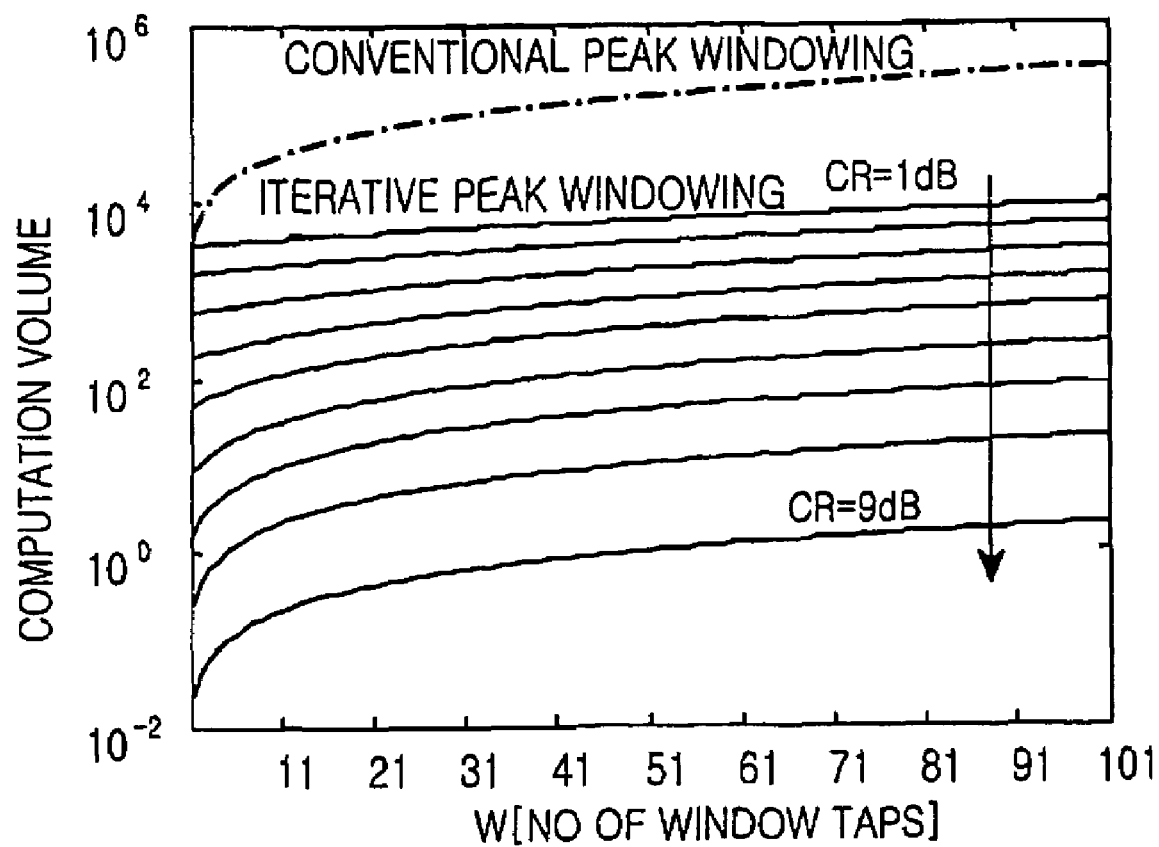
FIG. 4 is a graph comparing PAPR reduction by the conventional peak windowing with PAPR reduction by iterative peak windowing according to the present invention based on computation complexity.

FIG. 4 is a graph illustrating a comparison based on computation complexity between the conventional peak windowing-based PAPR reduction and the iterative peak windowing-based PAPR reduction according to the present invention, with respect to a varying Clipping Ratio (CR).

Assuming that an FFT size is N, a window function length is W and the number of peaks is P, the conventional peak windowing-based PAPR reduction technique requires a total of (3W+1)N calculations because a convolution takes W multiplications and 2W additions for each sample, i.e. a total of 3W calculations for each sample, and N multiplications are further performed to achieve a final transmission signal. In the iterative peak windowing-based PAPR reduction technique, P peak positions are achieved in the same manner as in the conventional peak windowing, the highest of the peaks is detected by (P−1) comparisons, and the comparisons are iterated P times. Thus, a total of (P−1)P comparisons are performed. Moreover, 5W multiplications' and additions take place during each iteration. Therefore, a total of (P−1)P+5WP calculations are performed for the iterative peak windowing-based PAPR reduction.

For a window length ranging from 1 to 101, the iterative peak windowing-based PAPR reduction requires fewer computations than the conventional peak windowing-based PAPR reduction, when the CR increases from 1 to 9.

As described above, the present invention provides an MCM communication system, particularly a PAPR reduction apparatus and method in an OFDM communication system. The PAPR reduction technique reduces a required computation volume without performance degradation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for reducing Peak-to-Average Power Ratio (PAPR) in a communication system, comprising:
   a magnitude/phase extractor for extracting magnitude and phase components from transmission sample data;
   a maximum peak detector for detecting a highest peak by determining the magnitude component of each sample, received from the magnitude/phase extractor;
   a peak windower for updating the highest peak, if the highest peak is greater than a threshold, and feeding back the updated highest peak to the maximum peak detector; and
   a complex signal combiner for generating, if the highest peak is less than or equal to the threshold, a complex signal by combining magnitude components received from the peak windower with the phase components received from the magnitude/phase extractor, wherein the complex signal combiner generates the complex signal by the following equation:

$$y(l)=absx_r(l+(w\_len-1)/2)\exp(j \cdot angx(l)), l=0,1,len-1$$

where y(l) represents the complex signal value, r represents the number of iterations of peak windowing, $absx_r(l)$ represents the magnitude component of an $l^{th}$ sample in the $r^{th}$ peak windowing, w_len represents the window size, angx(l) represents the phase component of the $l^{th}$ sample, and len represents an Inverse Fast Fourier Transform (IFFT) size.

2. The apparatus of claim 1, wherein the peak windower comprises:
an update decider for providing the highest peak to an updater, if the highest peak is greater than the threshold and providing the highest peak to the complex signal combiner, if the highest peak is less than or equal to the threshold; and
the updater for updating the received highest peak and feeding back the updated peak to the maximum peak detector.

3. The apparatus of claim 1, wherein the peak windower updates the highest peak by the following equation:

$$absx_{r+1}(n) = \begin{cases} absx_r(n)d_r(n-m_1), & m_1 \le n < m_2 \\ absx_r(n), & \text{otherwise} \end{cases}$$

$$d_r(i) = 1 - w(i)(1 - A/x_{r,max})$$

$$m_1 = n_{r,max} - \frac{W-1}{2},$$

$$m_2 = n_{r,max} + \frac{W-1}{2}$$

where r represents a number of iterations of peak windowing, $absx_r(n)$ represents a magnitude component of an $n^{th}$ sample in an $r^{th}$ peak windowing, $d_r(j)$ represents a window value for the $r^{th}$ peak windowing, w(i) represents a weight value, A represents the threshold, $x_{r,max}$ represents the highest peak, $n_{r,max}$ represents an index of the highest peak, and W represents a window size.

4. A method of reducing Peak-to-Average Power Ratio (PAPR) in a communication system, comprising the steps of:
(A) extracting magnitude and phase components from transmission sample data;
(B) detecting peaks having magnitude components exceeding a threshold by comparing the extracted magnitude components with the threshold;
(C) detecting a highest of the peaks;
(D) comparing the highest peak with the threshold;
(E) updating the highest peak, if the highest peak is greater than the threshold; and
(F) generating, if the highest peak is less than or equal to the threshold, a complex signal by combining updated magnitude components with the extracted phase components, wherein the complex signal generation step comprises generating the complex signal by the following equation:

$$y(l)=absx_r(l+(w\_len-1)/2)\exp(j \cdot angx(l)), l=0,1len-1$$

where y(l) represents the complex signal value, r represents the number of iterations of peak windowing, $absx_r(l)$ represents the magnitude component of an $l^{th}$ sample in the $r^{th}$ peak windowing, w_len represents a window size, angx(l) represents a phase component of the $l^{th}$ sample, and len represents an Inverse Fast Fourier Transform (IFFT) size.

5. The method of claim 4, wherein steps (C), (D) and (E) are repeated until the highest peak is less than or equal to the threshold in step (D).

6. The method of claim 4, further comprising generating, if no peaks are detected, a complex signal by combining the extracted magnitude components with the extracted phase components.

7. The method of claim 4, wherein step (E) comprises updating the highest peak by the following equation:

$$absx_{r+1}(n) = \begin{cases} absx_r(n)d_r(n-m_1), & m_1 \le n < m_2 \\ absx_r(n), & \text{otherwise} \end{cases}$$

$$d_r(i) = 1 - w(i)(1 - A/x_{r,max})$$

$$m_1 = n_{r,max} - \frac{W-1}{2},$$

$$m_2 = n_{r,max} + \frac{W-1}{2}$$

where r represents a number of iterations of peak windowing, $absx_r(n)$ represents the magnitude component of an $n^{th}$ sample in an $r^{th}$ peak windowing, $d_r(j)$ represents a window value for the $r^{th}$ peak windowing, w(i) represents a weight value, A represents the threshold, $x_{r,max}$ represents the highest peak, $n_{r,max}$ represents an index of the highest peak, and W represents a window size.

8. An apparatus for reducing Peak-to-Average Power Ratio (PAPR) in a multi carrier communication system, comprising:
a magnitude/phase extractor for extracting magnitude and phase components from transmission sample data;
a maximum peak detector for detecting a highest peak by determining the magnitude component of each sample, received from the magnitude/phase extractor;
a peak windower for updating the highest peak, if the highest peak is greater than a threshold, and feeding back the updated highest peak to the maximum peak detector; and
a complex signal combiner for generating, if the highest peak is less than or equal to the threshold, a complex signal by combining magnitude components received from the peak windower with the phase components received form the magnitude/phase extractor,
wherein the complex signal combiner generates the complex signal by the following equation:

$$y(l)=absx_r(l+(w\_len-1)/2)\exp(j \cdot angx(l)), l=0,1,len-1$$

where y(l) represents the complex signal value, r represents the number of iterations of peak windowing, $absx_r(l)$ represents the magnitude component of an $l^{th}$ sample in the $r^{th}$ peak windowing, w_len represents the window size, angx(l) represents the phase component of the $l^{th}$ sample, and len represents an Inverse Fast Fourier Transform (IFFT) size.

9. The apparatus of claim 8, wherein the multi carrier communication system is an Orthogonal Frequency Division Multiplexing (OFDM) communication system.

10. A method of reducing Peak-to-Average Power Ratio (PAPR) in a multi carrier communication system, comprising the steps of:
(A) extracting magnitude and phase components from transmission sample data;
(B) detecting peaks having magnitude components exceeding a threshold by comparing the extracted magnitude components with the threshold;
(C) detecting a highest of the peaks;
(D) comparing the highest peak with the threshold;

(E) updating the highest peak, if the highest peak is greater than the threshold; and (F) generating, if the highest peak is less than or equal to the threshold, a complex signal by combining updated magnitude components with the extracted phase components, wherein the complex signal generation step comprises generating the complex signal by the following equation:

$$y(l)=absx_r(l+(w\_len-1)/2)\exp(j\cdot angx(l)), l=0,1,len-1$$

where y(l) represents the complex signal value, r represents the number of iterations of peak windowing, $absx_r(l)$ represents the magnitude component of an $l^{th}$ sample in the $r^{th}$ peak windowing, w_len represents a window size, angx(l) represents a phase component of the $l^{th}$ sample, and len represents an Inverse Fast Fourier Transform (IFFT) size.

11. The method of claim 10, wherein steps (C), (D) and (E) are repeated until the highest peak is less than or equal to the threshold in step (D).

12. The method of claim 10, wherein the multi carrier communication system is an Orthogonal Frequency Division Multiplexing (OFDM) communication system.

* * * * *